United States Patent
Mayer (10) Patent No.: US 12,076,883 B2
(45) Date of Patent: Sep. 3, 2024

(54) METHOD FOR PRODUCING A COMPONENT FROM CURABLE MATERIAL AND CORRESPONDING COMPONENT

(71) Applicant: PERI SE, Weissenhorn (DE)

(72) Inventor: Juergen Mayer, Deisenhausen (DE)

(73) Assignee: PERI SE, Weissenhorn (DE)

( * ) Notice: Subject to any disclaimer, the term of this patent is extended or adjusted under 35 U.S.C. 154(b) by 577 days.

(21) Appl. No.: 17/049,330

(22) PCT Filed: Apr. 20, 2019

(86) PCT No.: PCT/EP2019/060249
§ 371 (c)(1),
(2) Date: Oct. 20, 2020

(87) PCT Pub. No.: WO2019/202156
PCT Pub. Date: Oct. 24, 2019

(65) Prior Publication Data
US 2021/0370546 A1   Dec. 2, 2021

(30) Foreign Application Priority Data
Apr. 20, 2018   (DE) ..................... 10 2018 109 501.5

(51) Int. Cl.
*B28B 1/00*   (2006.01)
*B28B 11/24*   (2006.01)
(Continued)

(52) U.S. Cl.
CPC ............ *B28B 1/001* (2013.01); *B28B 11/245* (2013.01); *B33Y 10/00* (2014.12); *B33Y 70/10* (2020.01); *B33Y 80/00* (2014.12)

(58) Field of Classification Search
CPC ....... B28B 1/001; B28B 11/245; B28B 23/02; B28B 3/20; E04G 21/0463; B33Y 70/10; B33Y 10/00; B33Y 80/00
See application file for complete search history.

(56) References Cited

U.S. PATENT DOCUMENTS 7,837,378 B2   11/2010   Khoshnevis
2004/0188715 A1   9/2004   Spirin
(Continued)

FOREIGN PATENT DOCUMENTS

| CN | 106313272 | 1/2017 |
|---|---|---|
| WO | 2005070657 | 8/2005 |
| WO | 2015197910 | 12/2015 |

*Primary Examiner* — Monica A Huson
*Assistant Examiner* — Kelsey C Grace
(74) *Attorney, Agent, or Firm* — SLEMAN & LUND LLP (57) ABSTRACT

A process for producing a component from a curable material, a new layer of the material being printed in periodically recurring steps in a 3D printing process onto a layer located thereunder so as to have lower reinforcing elements which protrude above the top of this new layer, and also relates to a component produced by a corresponding process. Known processes and components do not allow reinforcement over a large surface area.

The object of designing a process in such a way that the reinforcement thereof withstands high loads is achieved by providing that, after each layer has been printed, upper reinforcing elements are connected to the lower reinforcing elements so as to extend said lower reinforcing elements and so as to form the lower reinforcing elements of the subsequent layer.

15 Claims, 8 Drawing Sheets

(51) Int. Cl.
  *B33Y 10/00* (2015.01)
  *B33Y 70/10* (2020.01)
  *B33Y 80/00* (2015.01)

(56) References Cited

U.S. PATENT DOCUMENTS

| | | |
|---|---|---|
| 2005/0194401 A1 | 9/2005 | Khoshnevis |
| 2015/0069656 A1 | 3/2015 | Bowers |
| 2017/0129153 A1* | 5/2017 | Koivuharju ............ B33Y 80/00 |
| 2017/0283297 A1 | 10/2017 | Kulmagambetov |
| 2018/0071949 A1 | 3/2018 | Giles |

\* cited by examiner

METHOD FOR PRODUCING A COMPONENT FROM CURABLE MATERIAL AND CORRESPONDING COMPONENT

FIELD OF THE INVENTION

The invention relates to a process for producing a component from curable material and to a corresponding component.

BACKGROUND OF THE INVENTION

Even in industrialized countries, the production of concrete structures is still largely based on manual work. In principle, such structures or parts of these structures can be produced in two different ways. Work can be done on-site using formwork, which is then filled with what is referred to as in-situ concrete, it being possible for additional reinforcements to be introduced for load-bearing parts. It is then left until the concrete has partially or fully cured, after which the formwork can be removed, cleaned and then used again. The process is time-consuming and requires the use of a large number of employees on the construction site.

Another method is to cast the concrete parts of the structure beforehand in a factory, i.e. to create them as prefabricated components and to deliver them as such to the construction site. Not only walls or floor components, but entire room cells can be produced from concrete as prefabricated parts and delivered to the construction site. This process is less expensive, but has a high degree of standardization and is therefore suitable only for the production of a large number of identical or similar structures or for very large structures which require a large number of identical room cells. An individual design is again only possible at high cost.

Based on these known techniques, what is referred to as an additive manufacturing process has recently evolved in the production of concrete structures, namely 3D printing of concrete. The structure is designed on a computer and the data is then forwarded to a printer. The printer is a fully automatic gantry robot that is larger than the building or part of the building to be created.

Instead of gantry robots, multi-axis or shelf-mounted robots or mobile robots can also be used. The robot has a printhead and concrete feeders, via which the in-situ concrete is fed to the printhead. This printhead then pours the structure to be created or the walls of said structure in a plurality of layers one above the other, each layer having a thickness between 1 and 10 cm.

The concrete used is viscous enough to maintain stability until it cures, or at least until it partially cures. In this way, the printhead pours a wall in a plurality of layers arranged one above the other.

Reinforcement of the walls is problematic when creating structures using 3D printing processes. In principle, finished steel frameworks or similar reinforcing elements can also be introduced, but this can only be done if the wall is at least partially printed, since the reinforcing elements would otherwise disrupt or prevent the movement of the printhead. However, if the wall is left until it is completely printed, the lower layers of the concrete have already fully or largely cured, meaning that reinforcing elements can no longer be subsequently introduced.

CN 106313272 A describes a 3D printing process for producing concrete structures, the concrete being reinforced with fiber materials and two printheads being operated, one of which prints the concrete and the other of which prints steel elements. The introduced steel elements each extend through two layers of the concrete located one above the other and thus connect said layers.

The disadvantage here is that only a punctiform connection of adjacent concrete layers is possible, but no reinforcement over a large surface area, as is possible in classical production processes, for example using steel meshes.

SUMMARY OF THE INVENTION

The object of the invention is that of designing a process for producing a component from curable material, in particular concrete, such that the reinforcement thereof withstands high loads.

A further object is that of providing a corresponding component.

BRIEF DESCRIPTION OF THE DRAWINGS

Some embodiments of the invention are explained in more detail below with reference to the accompanying drawings, in which.

DETAILED DESCRIPTION

Figure 1:
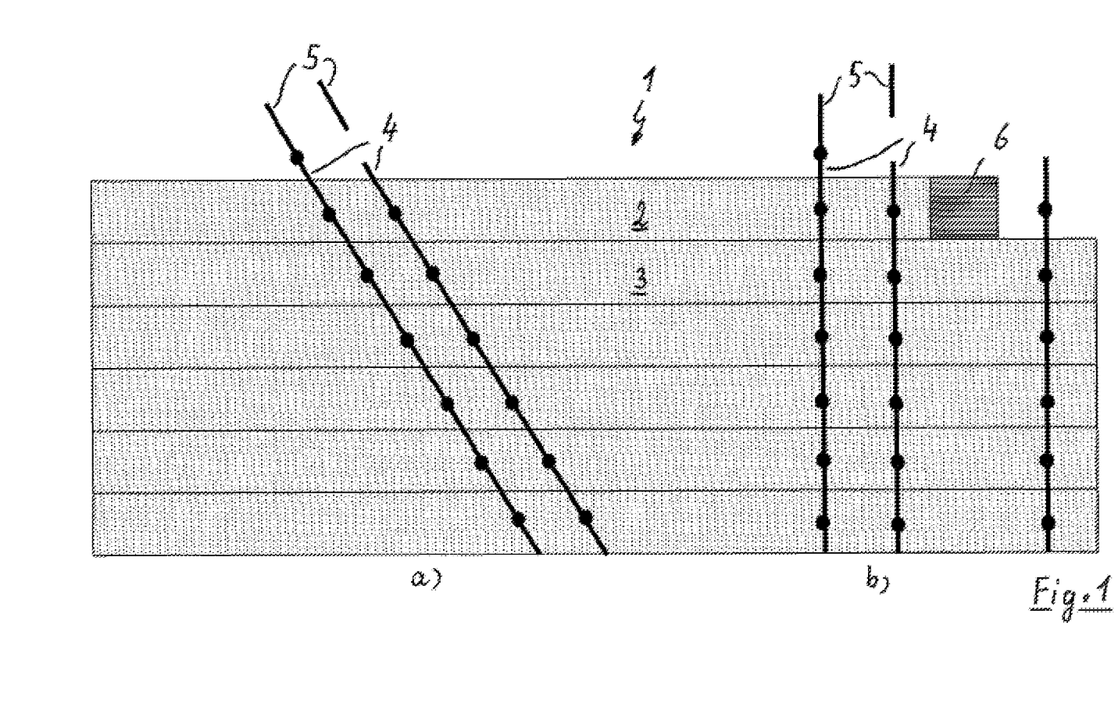
FIG. 1: shows a cross section through a partially created component in accordance with the process according to the invention in a first variant (a) and a second variant (b)

In order to carry out the process according to the invention, a 3D printer, for example in the form of a fully automatic gantry robot, is used—to this extent in a manner known per se—which can print, in successive layers, a wall or a complete room cell or further vertical units of a structure. In FIG. 1, a component 1 is shown in the process of being created, which component consists of a plurality of layers of concrete printed one above the other, the uppermost layer being provided with the reference number 2 and the immediately subjacent layer being provided with the reference number 3. Here, the uppermost layer 2 is still in the process of being created, i.e. during the printing process. The printhead 6 is only shown schematically.

FIG. 1 shows two variants for introducing reinforcing elements 4 and 5 into the layers 2 and 3 of the component 1.

In the two variants shown, a lower layer 3 of the curable material, in this case concrete, is first printed in a 3D printing process, and then further upper reinforcing elements are connected to the lower reinforcing elements 4 protruding from said layer 3, which upper reinforcing elements are sufficiently long that they also penetrate the upper layer 2 to be printed later and still project from said layer a little after the printhead 6 has printed this upper layer 2. In the next process step, the layer 2 located above said lower layer is printed thereon, the lower rein-forcing elements 4, as described above, projecting above the top of the upper layer 2. In the next process step, further, similar reinforcing elements 5 are rigidly connected to the lower reinforcing elements 4, for example by a welded connection, on the tops of the reinforcing elements 4 protruding from the upper layer 2. Further connection types are described below. The next layer (not shown in the figure) of the curable material is then applied to the uppermost layer 2 in a 3D printing process and the process recurs periodically. Each reinforcing element 4 or 5 consists of a rigid material, in particular metal, for example steel, or of a hard plastics material. The reinforcing elements 4 and 5 that are welded together form a continuous strand.

In variant (a) (shown on the left in FIG. 1), the strands consisting of the reinforcing elements 4, 5 extend perpendicularly to the layers 2, 3 and, in variant (b) (shown on the right in FIG. 1), the strands consisting of the reinforcing elements 4, 5 extend at an angle of approximately 60° to the layers 2, 3. Other angles, preferably between 10° and 90°, are possible and advantageous depending on the field of application. The process is also suitable for other curing materials than concrete, in particular thixotropic materials.

Figure 2:
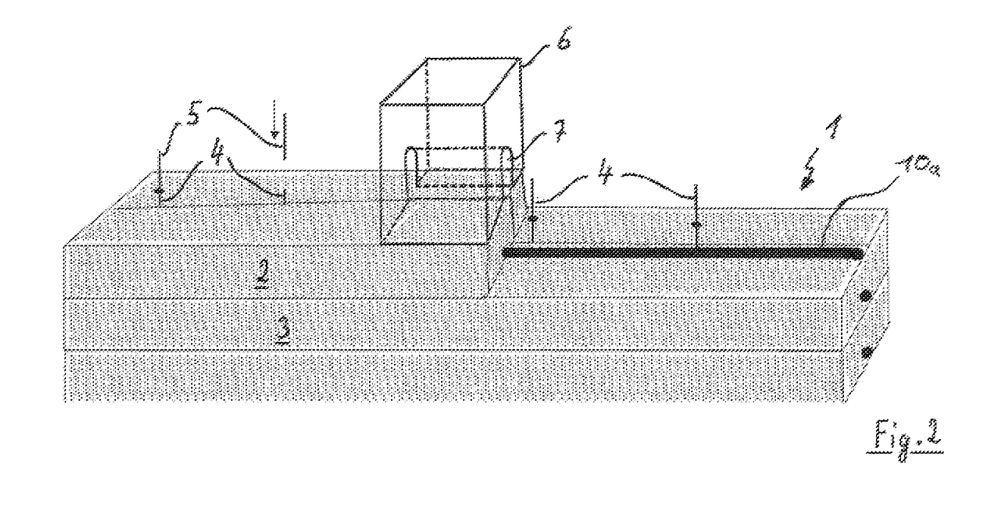
FIG. 2: is a perspective view of the process according to the invention using a first print-head.

When the printhead 6 has printed the uppermost layer 2 of the curable material, the reinforcing elements 4 always protrude sufficiently far from this uppermost layer 2 that a protrusion also occurs when the next layer is printed. It is therefore preferable to use a printhead 6, as shown in FIG. 2, comprising a recess 7 for the projecting reinforcing elements 4, 5, so as not to dam-age or tear out said elements. In particular, a printhead 6 is suitable for this purpose which has two openings for the parallel outlet of two side-by-side strands of curable material, the two strands jointly forming one layer. The region between the two openings of the printhead 6 can remain free and forms a recess 7 such that the printhead 6 can also be guided over the ends of the reinforcing elements 4 projecting from the subjacent layers 2 and 3.

After the printhead 6 has printed the uppermost layer 2, the upper reinforcing elements 5 are connected to the reinforcing elements that project from the uppermost layer 2 and go back in-to the subjacent layer 3, the type of connection being described further below. The printhead 6 then prints the next layer.

After printing, further reinforcing elements 10, which are oriented substantially horizontally or orthogonally to the reinforcing elements designed according to the invention, can be applied to, for example placed on, the layers. These further reinforcing elements are, for example, rigid elements such as rods 10*a*. However, threads, chains, cables or the like can also be placed on the layers. When the next layer is formed, the horizontal reinforcing elements 10, 10*a* are then covered and increase the tensile strength of the component in the printing direction. The introduction takes place in a fully or partially automated manner or manually. A horizontally oriented reinforcing element does not necessarily have to be provided in every layer. There is also the possibility that additional reinforcing elements 10, 10*a* are only introduced in particularly stressed regions.

Figure 3:
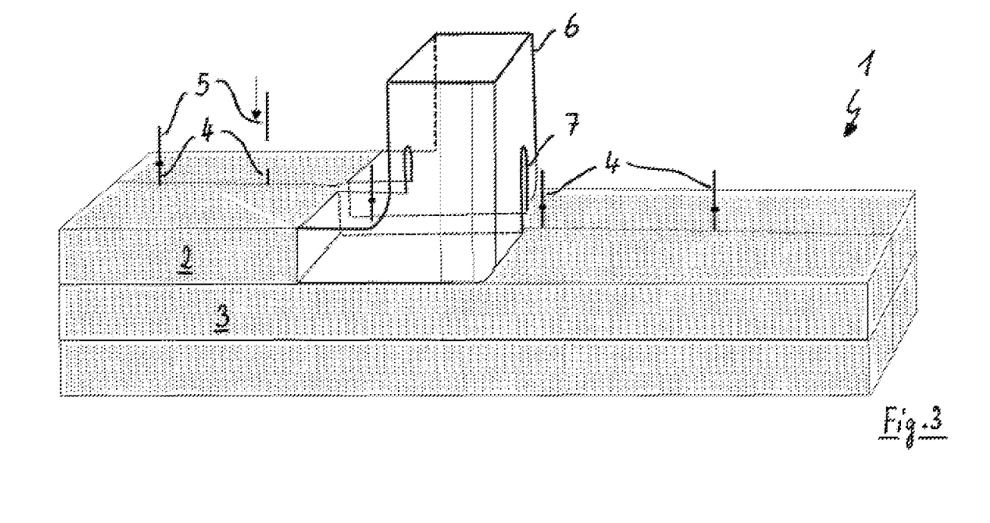
FIG. 3: is a view according to FIG. 2 using a second printhead.

An alternative embodiment of a printhead with otherwise the same process parameters is shown in FIG. 3. The printhead 6 according to FIG. 3 differs from the printhead 6 according to FIG. 2 in that the two outlets for the curable material are curved backwards by 90°, and there-fore the outlet for the curable material is not perpendicularly down-ward, but in the direction of the layer 2 just printed and against the direction of movement of the printhead 6. In this case too, the printhead 6 has a recess 7 through which the reinforcing elements 4 projecting from the subjacent layers 2, 3 can pass when the printhead 6 moves thereover.

Figure 4:
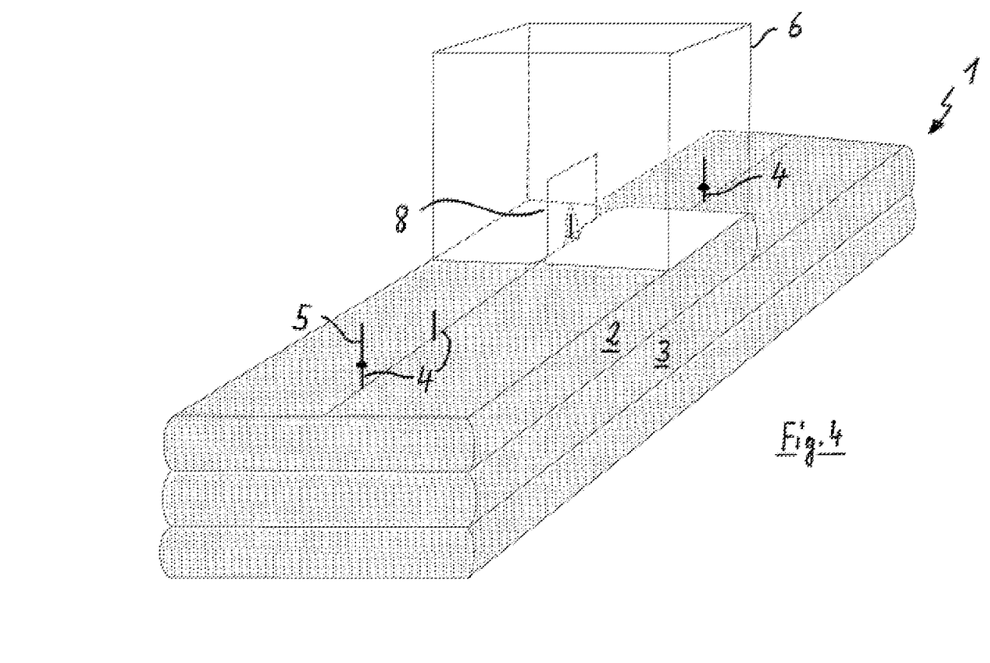
FIG. 4: is a view according to FIGS. 2 and 3 using a third printhead.

FIG. 4 shows a further alternative embodiment for carrying out the process using a flexible printhead 6. The printhead 6 shown in FIG. 4 does not have a recess 7, but has a central region 8 which is designed to be flexible such that the reinforcing elements 4 protruding from the two subjacent layers 2, 3 conform flexibly to the inside of the printhead when the printhead travels over. The flexible design of the printhead 6 can be carried out by selecting a suitable material in the region of the central region 8, for example by a plastics material, silicone material or rubber material. FIG. 4 shows schematically how a reinforcing element 4 is located exactly in the middle of the central region 8 and is enclosed by the flexible material of the print-head 6 that is present there. Using the flexible central region 8 of the printhead 6, errors in positioning the reinforcing elements 4 can be flexibly compensated for. In this case, the reinforcing elements 4 do not strike against a rigid printhead 6 since the flexible passage adapts to a certain extent. In addition, the two strands of the curable material leaving the printhead 6 can be printed closer together. If a reinforcing element 4 passes through the printhead 6, the pas-sage in the central region 8 conforms to the reinforcing element 4, which improves the embed-ding of the reinforcing element 4 in the curable material.

In all of the embodiments according to FIGS. 2, 3 and 4, the printhead 6 has two outlets for the curable material, one outlet being arranged on the left and one outlet being arranged on the right of the recess 7 or of the central region 8. In this way, each layer 2 or 3 is split into two side-by-side layers, which ideally, however, intimately intermix after the printing process has been carried out such that a boundary surface is no longer discernible.

Figure 5:
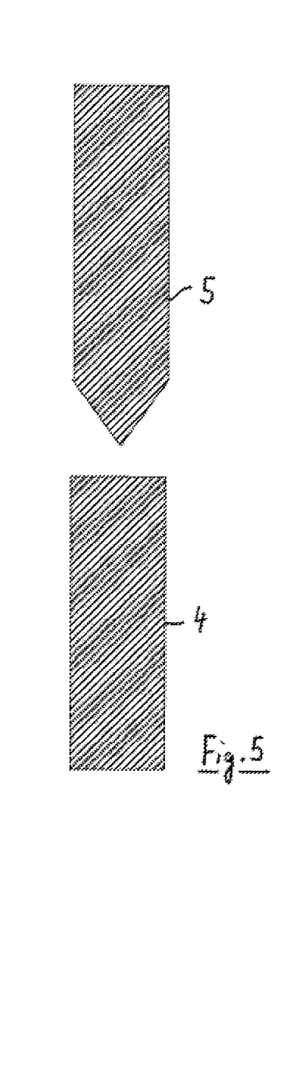
FIG. 5: is a schematic view of a first variant of the connection of adjacent reinforcing elements.
Figure 6:
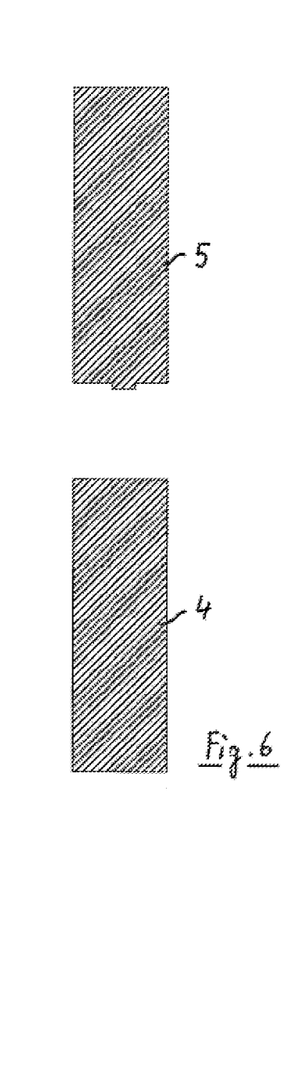
FIG. 6: is a view according to FIG. 5 in a second variant.
Figure 7:
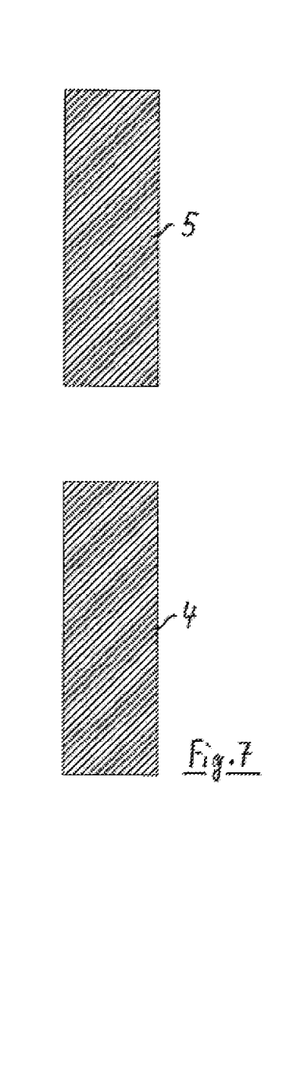
FIG. 7: is a view according to FIG. 5 in a third variant.

The connection of adjacent lower reinforcing elements 4 with upper reinforcing elements 5 arranged thereabove is shown in various variants in FIG. 5-12. The variants shown in FIGS. 5, 6 and 7 are particularly favorable for welding processes, in particular the stud welding process. Here, the upper reinforcing element 5 can be connected to the lower reinforcing element 4 in a manner known per se by a welded connection. In the embodiment according to FIG. 5, the upper reinforcing element 5 has an acute angle at the bottom thereof for a better welded connection to the flat surface of the lower reinforcing element 4.

In the embodiment according to FIG. 6, the upper reinforcing element has a kind of protruding knob in the central region of the bottom thereof, while the top of the lower reinforcing element 4 is planar.

In the variant according to FIG. 7, both the bottom of the upper reinforcing element 5 and the top of the lower reinforcing element 4 are planar, and therefore a direct stud weld connection is possible.

Figure 8:
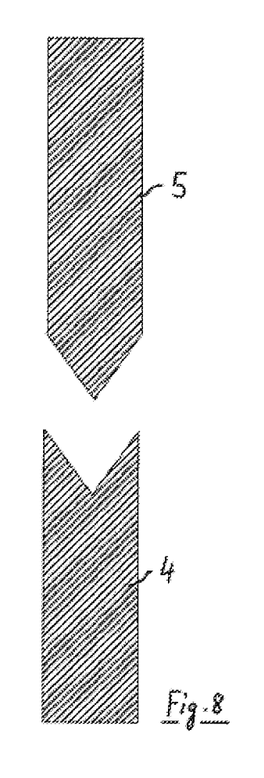
FIG. 8: is a view according to FIG. 5 in a fourth variant.
Figure 9:
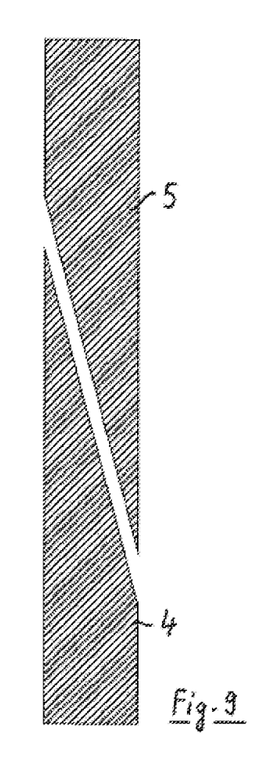
FIG. 9: is a view according to FIG. 5 in a fifth variant.
Figure 10:
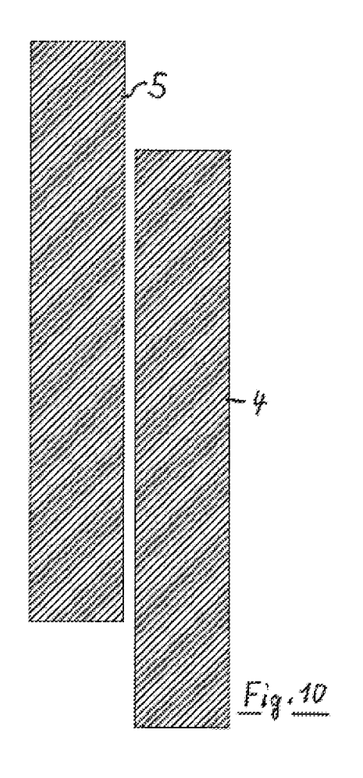
FIG. 10: is a view according to FIG. 5 in a sixth variant.

Possible adhesive connections are shown in FIG. 8-10. In FIG. 8 the adhesive is introduced be-tween the pointed bottom of the upper reinforcing element 5 and the upper face of the lower reinforcing element 4, which by contrast is dovetail-shaped, before the upper reinforcing element 5 is brought under pressure onto the lower reinforcing element 4.

In the embodiment according to FIG. 9, the adhesive is introduced into the gap between the tapered lower end of the upper reinforcing element 5 and the complementary tapered upper end of the lower reinforcing element 4.

In the embodiment according to FIG. 10, the upper reinforcing element 5 overlaps the lower reinforcing element 4, the side surfaces overlapping and an adhesive being introduced into the overlap region.

In addition, all variants according to FIG. 8-10 are used not only for the adhesive connection, but a welded connection of the adjacent reinforcing elements 4 and 5 can also be carried out in these variants.

Figure 11:
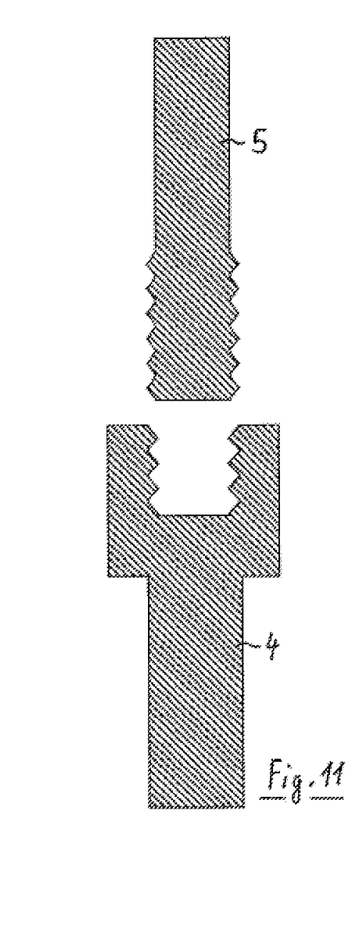
FIG. 11: is a view according to FIG. 5 in a seventh variant.
Figure 12:
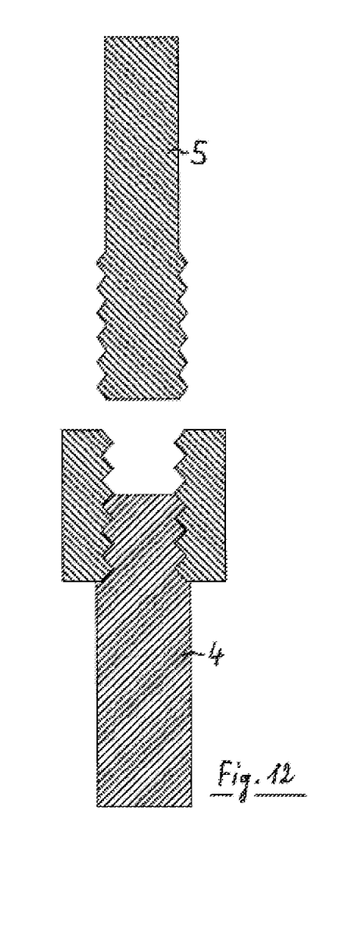
FIG. 12: is a view according to FIG. 5 in an eighth variant.

Two further connection options are shown in FIGS. 11 and 12. A screw connection takes place here. In the embodiment according to FIG. 11, the upper end of the lower reinforcing element 4 has an integrated screw-nut having an internal thread, while the lower region of the upper reinforcing element 5 has an external thread, which can be screwed into said integrated screw-nut of the lower reinforcing element 4.

In the embodiment according to FIG. 12, both the upper region of the lower reinforcing element 4 and the lower region of the upper reinforcing element 5 have external threads, and a union nut having an internal thread is used, into which the two external threads of the reinforcing elements 4-5 are screwed in order to produce a secure connection.

Instead of connecting adjacent reinforcing elements 4 by welding, a connection can also be carried out by screwing or gluing. For a screw connection, the ends of the reinforcing elements 4 can each be provided with an external thread, a common union nut interconnecting the two ends. One end of a reinforcing element 4 can also have an internal thread, while the adjacent reinforcing element 4 has a matching external thread. If the adjacent reinforcing elements 4 are glued together, it is advisable to provide a large-surface-area end surface so that a good adhesive connection is possible.

The process according to the invention and the component created by said process have the ad-vantage of a substantially more intimate connection of the reinforcing elements 4 and substantially stronger reinforcement, since the strands 5 consisting of individual reinforcing elements 4 can achieve a similar effect to that of classical concrete casting using a steel mesh. The formation according to the invention of strands 5 consisting of individual reinforcing elements 4 makes it possible, even in 3D printing, where a continuous steel mesh cannot be used, to achieve the same or similar strength values as when using continuous reinforcing steel meshes in the concrete casting process.

Figure 13:
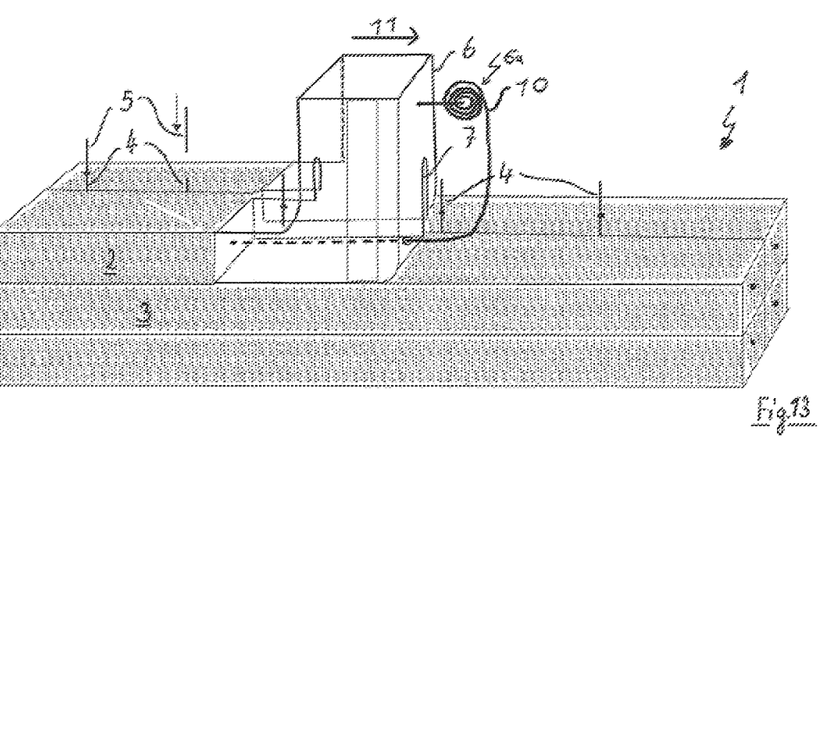
FIG. 13: is a view according to FIG. 3 in a further variant.

In an advantageous development, additional reinforcing elements 10 can be used during or after printing in the process according to the invention. These can be designed in particular as a wire, rod, cable, chain or roving. The process according to the invention and the additional reinforcing elements 10, such as wire, rod, cable, chain or roving, have the advantage that the tensile and compressive strength of the component formed is increased. This increases the strength, in particular in the printing direction. The additional reinforcing elements 10 such as wire, rod, cable, chain or roving can be introduced into the extruded curable material, in particular in a printing direction 11, during or after printing. As can be seen in FIG. 13, the printhead 6 can comprise additional means via which the additional reinforcing element 10 is also introduced during printing. For example, wires, cables, chains or rovings can be unwound from a spool 6a, which is moved in the printing direction at the same time as the printhead 6. Rods can be supplied in a manner known per se, in a manner assisted by the printhead 6 or independently therefrom, for example placed on or inserted (not shown). Alternatively, an additional means according to FIG. 2 can be provided, by means of which the additional reinforcing means 10 are placed on or in the formed layers 2, 3. As an alternative to the rod, a flexible element such as cable, chain or rovings can be placed on or inserted.

In a further embodiment, which is considered to be favorable, additional fibers, in particular polymer fibers, glass fibers or carbon fibers, can be added to the extruded curable material. This further increases the strength.

The invention claimed is:

1. A process for producing a component from a curable material, a new layer of the material being printed in periodically recurring steps in a 3D printing process onto a layer located thereunder so as to have lower reinforcing elements which protrude above the top of this new layer,
   wherein after each layer has been printed, upper reinforcing elements are connected to the lower reinforcing elements so as to extend said lower reinforcing elements and so as to form the lower reinforcing elements of the subsequent layer,
   wherein a printhead does not have a recess, but has a central region which is designed to be flexible such that the reinforcing elements protruding from the two subjacent layers conform flexibly to the inside of the printhead when the printhead travels over, wherein the flexible design of the printhead is carried out by selecting a suitable material in the region of the central region, wherein the suitable material comprises at least one of a plastics material, silicone material, or rubber material.

2. The process according to claim 1, wherein the curable material is concrete.

3. The process according to claim 1, wherein the reinforcing elements consist of a rigid material.

4. The process according to claim 1, wherein the connection of reinforcing elements located one above the other is a weld connection or a screw connection or an adhesive connection.

5. The process according to claim 1, wherein the reinforcing elements extend perpendicularly to the layers.

6. The process according to claim 1, wherein the reinforcing elements extend at an angle between 90° and 45° to the layers.

7. The process according to claim 1, wherein the reinforcing elements are rod-shaped.

8. The process according to claim 1, wherein at least one additional reinforcing element is introduced into the layers so as to extend in a printing direction.

9. The process according to claim 8, wherein the additional reinforcing element is designed as a wire, rod, cable, chain or roving, the additional reinforcing element being introduced, before, during or after the printing of each layer.

10. The process according to claim 1, wherein the curable material is mixed with fibers.

11. The process according to claim 9, wherein the additional reinforcing element is introduced by being placed in or on.

12. The process according to claim 10, wherein the fibers are steel fibers, polymer fibers, glass fibers or carbon fibers.

13. The process according to claim 3, wherein the rigid material is steel or plastics material.

14. A process for producing a component from a curable material, a new layer of the material being printed in periodically recurring steps in a 3D printing process onto a layer located thereunder so as to have lower reinforcing elements which protrude above the top of this new layer,
   wherein after each layer has been printed, upper reinforcing elements are connected to the lower reinforcing elements so as to extend said lower reinforcing elements and so as to form the lower reinforcing elements of the subsequent layer, wherein a printhead has a central region configured to be flexible such that the reinforcing elements protruding from the two subjacent layers conform flexibly to the inside of the printhead when the printhead travels over, wherein a material of the central region is a plastics material, silicone material, or rubber material.

15. A process for producing a component from a curable material, a new layer of the material being printed in periodically recurring steps in a 3D printing process onto a layer located thereunder so as to have lower reinforcing elements which protrude above the top of this new layer, wherein after each layer has been printed, upper reinforcing elements are connected to the lower reinforcing elements so as to extend said lower reinforcing elements and so as to form the lower reinforcing elements of the subsequent layer, wherein the printhead does not have a recess, but has a central region configured to be flexible such that the reinforcing elements protruding from the two subjacent layers conform flexibly to the inside of the printhead when the printhead travels over, wherein a material of the central region is a plastics material, silicone material, or rubber material.

* * * * *